United States Patent
Brown et al.

(10) Patent No.: US 12,406,015 B2
(45) Date of Patent: Sep. 2, 2025

(54) CORRELATING OPEN SOURCE COMPONENT MATCHING RESULTS USING DIFFERENT SCANNING TECHNIQUES

(71) Applicant: Black Duck Software, Inc., Burlington, MA (US)

(72) Inventors: Douglas Albert Brown, Danvers, MA (US); Damon Alexander Weinstein, Arlington, MA (US); Jagat Prakashchandra Parekh, Andover, MA (US)

(73) Assignee: Black Duck Software, Inc., Burlington, MA (US)

( * ) Notice: Subject to any disclaimer, the term of this patent is extended or adjusted under 35 U.S.C. 154(b) by 13 days.

(21) Appl. No.: 17/667,473

(22) Filed: Feb. 8, 2022

(65) Prior Publication Data
US 2023/0252100 A1    Aug. 10, 2023

(51) Int. Cl.
*G06F 16/9538* (2019.01)
*G06F 8/71* (2018.01)
*G06F 16/951* (2019.01)
*G06F 16/954* (2019.01)

(52) U.S. Cl.
CPC ............ *G06F 16/9538* (2019.01); *G06F 8/71* (2013.01); *G06F 16/951* (2019.01); *G06F 16/954* (2019.01)

(58) Field of Classification Search
CPC ... G06F 16/9538; G06F 16/954; G06F 21/564
See application file for complete search history.

(56) References Cited

U.S. PATENT DOCUMENTS

| | | | | |
|---|---|---|---|---|
| 9,324,070 | B1* | 4/2016 | Bekmann | G06Q 20/401 |
| 10,693,900 | B2* | 6/2020 | Zadeh | H04L 43/045 |
| 10,997,126 | B1* | 5/2021 | Bent | G06F 16/13 |
| 2012/0078845 | A1* | 3/2012 | Kasbekar | G06Q 10/107 |
| | | | | 707/E17.069 |
| 2012/0110515 | A1* | 5/2012 | Abramoff | G06F 16/904 |
| | | | | 715/854 |
| 2015/0234848 | A1* | 8/2015 | Weinstein | H04L 9/3239 |
| | | | | 707/698 |
| 2015/0234885 | A1* | 8/2015 | Weinstein | G06F 16/152 |
| | | | | 707/690 |
| 2015/0281355 | A1* | 10/2015 | Maturana | G06F 9/548 |
| | | | | 709/202 |
| 2018/0089278 | A1* | 3/2018 | Bhattacharjee | G06F 16/90335 |
| 2020/0358617 | A1* | 11/2020 | Baierlein | H04L 61/2592 |
| 2021/0174188 | A1* | 6/2021 | Hewitt | H04L 51/04 |

* cited by examiner

*Primary Examiner* — Kris E Mackes
(74) *Attorney, Agent, or Firm* — Lowenstein Sandler LLP

(57) ABSTRACT

A processing device receives a request to analyze the file hierarchy comprising the plurality of components and sends respective commands to a plurality of matching services. The processing device further receives respective individual results from the plurality of matching services, each of the respective individual results indicating a respective subset of the plurality of components, and correlates the respective individual results using external identifiers associated with the components of each respective subset to generate a unified set of results.

17 Claims, 6 Drawing Sheets

CORRELATING OPEN SOURCE COMPONENT MATCHING RESULTS USING DIFFERENT SCANNING TECHNIQUES

TECHNICAL FIELD

The present disclosure relates to the field of software composition analysis, and in particular to correlating open source component matching results using different scanning techniques.

BACKGROUND

There are more than 75 million open-source artifacts available in a myriad of Internet repositories. The unstructured nature of these artifacts poses the daunting challenge of identifying the underlying unique open-source components, to allow users to measure the security and compliance risks around their use of the open-source components both accurately and completely.

SUMMARY

A processing device receives a request from a requestor to analyze a file hierarchy comprising a plurality of components and sends respective commands to a plurality of matching services. The processing device further receives respective individual results from the plurality of matching services, each of the respective individual results indicating a respective subset of the plurality of components, and correlates the respective individual results using external identifiers associated with the components of each respective subset to generate a unified set of results. The processing device can further provide the unified set of results to the requestor, wherein providing the unified set of results to the requestor comprises causing the unified set of results to be displayed in a user interface.

In one embodiment, each of the plurality of matching services is to identify a respective subset of the plurality of components using a different respective scanning technique of a plurality of scanning techniques. The plurality of scanning techniques can include one or more of signature matching, package manager matching, binary matching, or snippet matching.

In one embodiment, correlating the respective individual results using the external identifiers comprises removing duplicate entries from the respective individual results and disambiguating version discrepancies in the respective individual results. To correlate the respective individual results using the external identifiers, the processing device can determine that multiple versions of one component are represented in the respective individual results and determine whether a full correlation exists for the external identifier of one of the multiple versions across the results of the multiple scanning techniques. Responsive to the existence of such full correlation, the processing device can identify the common version across the multiple techniques to be included in the unified set of results. Responsive to the absence of such full correlation, the processing device can identify an alternate version of the multiple versions having a highest confidence score to be included in the unified set of results.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
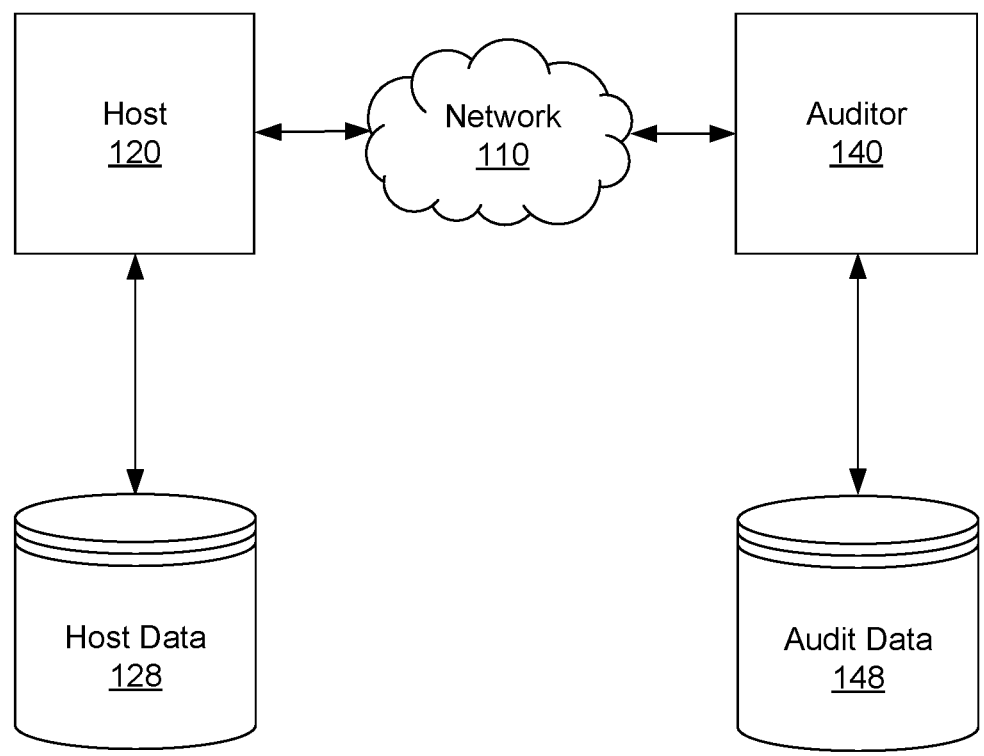
FIG. 1 is a block diagram illustrating an implementation of a system configuration in accordance with some embodiments of the present disclosure.

Aspects of the present disclosure relate to correlating open source component matching results using different scanning techniques. Certain software composition analysis systems, such as those implementing an auditor for example, utilize multiple scanning and matching techniques to identify specific components, such as open source components or other components, in a customer's file system. Some examples of those techniques include, but are not limited to, signature matching, package manager matching, binary matching, and snippet matching. For example, there can be multiple separate services, each providing one or more of the above scanning techniques, which can be called by the auditor and can each provide a separate set of results indicating the presence of open source components in a given repository (e.g., host data).

In conventional systems, the separate sets of results received from each of the separate services are not correlated in any way and can include duplicate and/or inconsistent entries representing the identified components. When the auditor identifies (e.g., matches) the same component, and potentially a version of that component, using multiple techniques, there can be duplicate entries in a list of results presented in a user interface, sometimes leading to confusion for customers. Similar confusion can result when multiple techniques identify different versions of the same component in the results, which are all presented in the same list in the user interface.

Aspects of the present disclosure address the above and other deficiencies by providing correlation of open source component matching results using different scanning techniques. In one embodiment, Match as a Service (MaaS) includes a single set of backend matching services capable of providing all the above scanning and matching techniques, with correlated results to eliminate confusion by providing increased accuracy and reduced duplication. With the introduction of MaaS comes the opportunity to leverage all of the above techniques in support of one another, thereby taking advantage of the individual strengths, efficiencies, and accuracies that each technique provides. The correlation of the multiple techniques will enable a single unified/ integrated matching result for each component, regardless of the technique(s) used to identify the component. In addition, when ambiguity exists with the results of one technique, the results from one or more of the other techniques can be used to disambiguate them.

While integrating the otherwise unrelated set of results from each of the matching techniques (e.g., signature, package manager, binary, and snippet scanning) has the useful outcome of being able to disambiguate overlapping ambiguous results, another value lies in the utilization of machine learning. As each of the techniques delivers a set of data and metadata, utilizing all the data and metadata provided by all the techniques creates a rich array of related features which can be used as inputs to a neural network. By correlating the results across the multiple available scanning and matching techniques, matching can be hyper-accurate helping customers to identify open-source risk components in their systems and software. In addition, the removal of redundant data and multiple versions (i.e., through disambiguation) can preserve system resources, such as by reducing the amount of storage used to maintain the matching results, and reducing the amount of bandwidth utilized to return the matching results to the requestor (e.g., the client device or host system).

FIG. 1 is a block diagram of an implementation of a system configuration in accordance with some embodiments of the present disclosure. Illustrated is a network 110 facilitating communication between a host computing system 120 and an auditor 140. The host computing system 120 stores files in a host data storage system 128, which can be analyzed by the auditor 140. In one embodiment, the auditor 140 stores data for use in the audit in an audit data storage system 148.

Although illustrated as distinct computing systems and storage systems, the host computing system 120 may include the host data storage system 128 and the auditor 140 may include the audit storage system 148. Furthermore, in some embodiments, the host computing system 120 may include the auditor 140, such that the network 110 might not be used.

Figure 6:
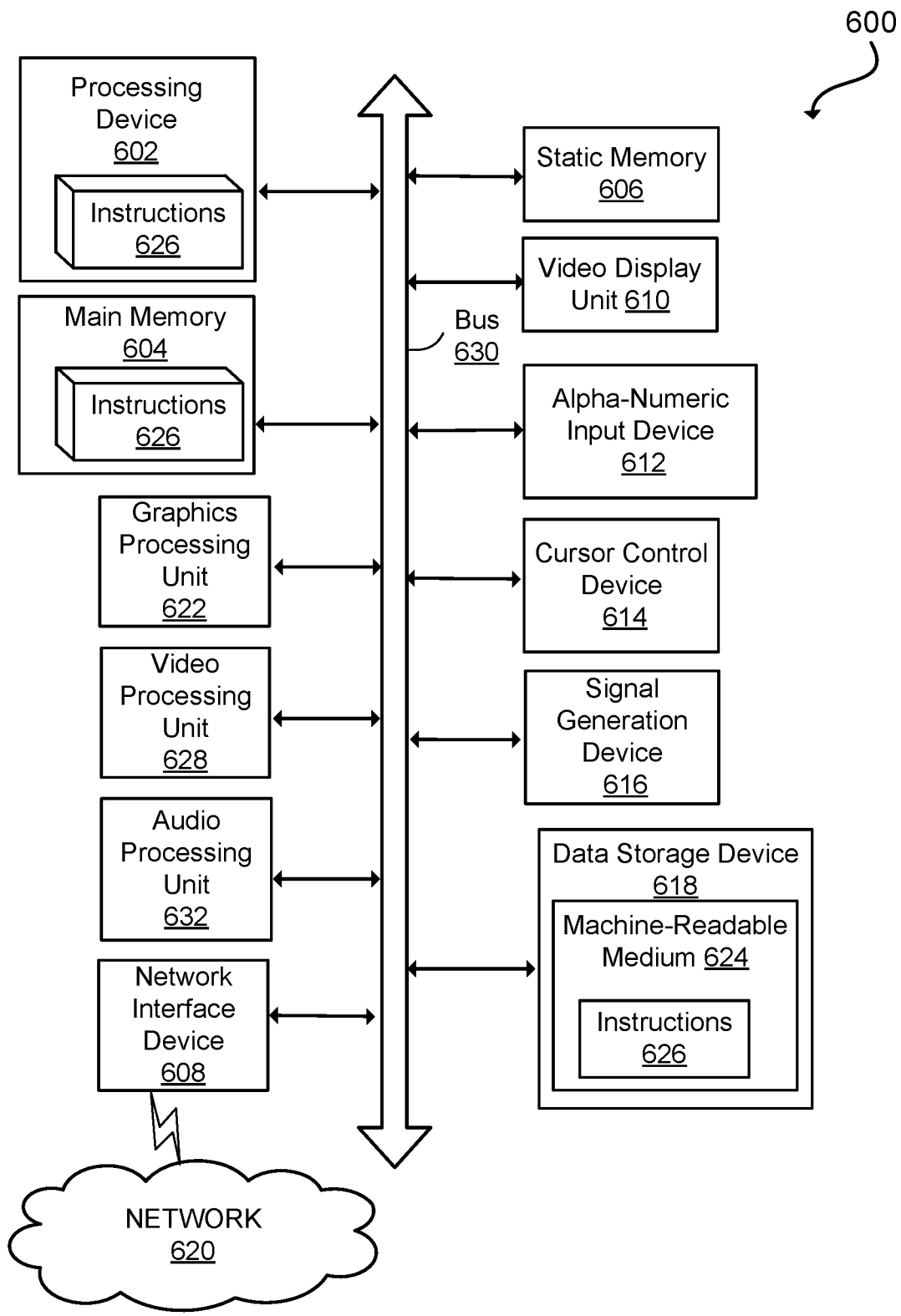
FIG. 6 depicts a diagram of an example computer system in which embodiments of the present disclosure may operate.

Generally, a host computing device 120 is used to manage or access the set of files to be analyzed, e.g., in a host data storage system 128. The host computing device 120 may include, for example, a computing device or software executing on a computing device. In certain embodiments, the host computing device 120 may be virtualized, may be cloud-based, or may include multiple computing devices working collaboratively. Illustrative examples of a host computing device 120 include, but are not limited to, a laptop, desktop, tablet, electronic pad, personal digital assistant, smart phone, video game device, television, kiosk, or portable computer. FIG. 6, described below, illustrates a computing device 600 that may be one representation of host computing device 120.

Generally, an auditor 140 is used to analyze or scan the set of files managed by the host computing device 120. The auditor 140 may include, for example, a computing device or software executing on a computing device. In certain embodiments, the auditor 140 may be virtualized, may be cloud-based, or may include multiple computing devices working collaboratively. In some implementations, the auditor 140 scans files stored by the host computing device 120 and stores information about the directories and files of the file hierarchy. The scan information may be stored in an audit data storage device 148. In some implementations, the auditor 140 compares files stored by the host computing device 120 to other files stored by the host computing device 120. In some implementations, the auditor 140 compares files stored by the host computing device 120 to files previously analyzed or reviewed by an auditor 140. These files, or signatures for these files, may be stored by an audit data storage device 148. In some implementations, the auditor 140 compares files stored by the host computing device 120 to files stored by a second host computing device (not illustrated), either concurrently or by use of data stored in an audit data storage device 148. The auditor 140 may be distinct from the host computing device 120 or implemented as part of the host computing device 120. FIG. 6, described below, illustrates a computing device 600 that may be one representation of auditor 140 or a computing device implementing auditor 140.

The network 110 is a network facilitating the interactions between computing devices, e.g., between a host computing device 120 and an auditor 140. An illustrative network 110 is the Internet; however, other networks may be used. The network 110 may also be described as a data network or as a communication network and may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some implementations, there are multiple networks 110 between computing devices. The network 110 may be public, private, or a combination of public and private networks. The topology of the network 110 may be a bus, star, ring, or any other network topology capable of the operations described herein. The network 110 can be used for communication between a host computing device 120 and an auditor 140.

As described, the host computing device 120 stores the files in a host data storage system 128. The host data storage system 128 may use internal data storage devices, external local data storage devices, and/or networked data storage devices. Likewise, the auditor 140 stores information in an audit data storage system 148. The audit data storage system 148 may use internal data storage devices, external local data storage devices, and/or networked data storage devices. Data storage devices may be volatile or non-volatile storage, hard drives, network attached storage, or storage area networks. Data storage devices may incorporate one or more mass storage devices for storing data, e.g., magnetic, magneto optical disks, or optical disks. Devices suitable for storing data include all forms of non-volatile memory, media and memory devices, including by way of example semiconductor memory devices, e.g., EPROM, EEPROM, and flash memory devices, magnetic disks, e.g., internal hard disks or removable disks, and optical discs, e.g., CD ROM, DVD-ROM, and Blu-Ray™ discs. Data storage devices may be virtualized. Data storage devices may be accessed via an intermediary server and/or via a network 110. Data storage devices may structure data as a database, e.g., as a relational database. Data storage devices may structure data as a collection of files, data blocks, or chunks. Data storage devices may provide for error recovery using, for example, redundant storage and/or error recovery data (e.g., parity bits).

In one embodiment, the auditor 140 can use multiple different scanning and matching techniques to identify certain components (e.g., open source components) in host data 128. As described in more detail below with respect to FIG. 2, those techniques can include, for example, signature scanning, package manager scanning, binary scanning, snippet scanning, and/or additional or different scanning techniques. Each scanning technique can provide a separate result to auditor 140, which may be stored in audit data 148. As noted above, the separate results can include redundancies (e.g., listing the same component multiple times) or inconsistencies (e.g., listing different versions of the same component). In one embodiment, auditor 140 implements Match as a Service (MaaS) to correlate the component matching results determined using the different scanning techniques. In one embodiment, MaaS uses external identifiers associated with each component to perform the correlation. As described in more detail below with respect to FIG. 3, an external identifier is a unique identifier having a defined format that is associated with each component. The MaaS can use the external identifiers of the components in host data 128 to identify a subset of the components that is of interest (e.g., those components that are open source), to eliminate redundancies in the results provided by the different scanning techniques, and to resolve discrepancies between different versions of the components. As external identifiers usually contain multiple fields, with broad categorical descriptors in the beginning fields, followed by increasingly narrower descriptors in the later fields, they can be used to aid in the correlation of different match types. For example, as the Project is broader than the Module and the Module is broader than the Version, correlation of a Module can help disambiguate a Version of a different type. Using the external identifier: Spring Boot:JPA:4.5.1, for example, a signature would match equally to any of: Spring Boot:JPA:4.4.9, Spring Boot:JPA:4.5.0, Spring Boot:JPA:4.5.1, or Spring Boot:JPA:4.5.2 By recognizing the correlated project name and module "Spring Boot:JPA" the version can be disambiguated. As a result, auditor 140 can provide a single unified list of results, which can optionally be presented in a user interface, such as a list of open source components identified using different matching techniques, but which is free of duplicate entries, inconsistent version identifiers, and other errors likely to cause confusion.

Figure 2:
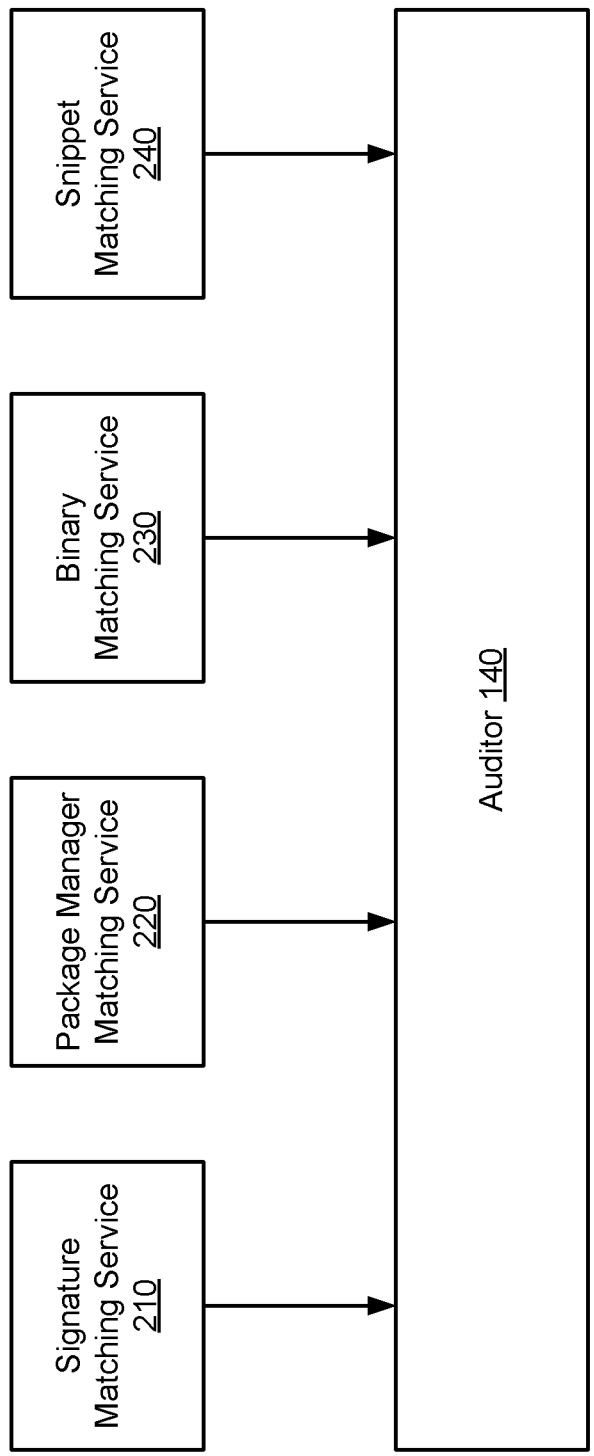
FIG. 2 is a block diagram illustrating different matching services utilized by an auditor in accordance with some embodiments of the present disclosure.

FIG. 2 is a block diagram illustrating different matching services utilized by an auditor in accordance with some embodiments of the present disclosure. In one embodiment, auditor 140 is communicably coupled with a number of matching services, each configured to utilize a different matching technique. For example, auditor 140 can be coupled with signature matching service 210, package manager matching service 220, binary matching service 230, and snippet matching service 240. In one embodiment, signature matching service 210, package manager matching service 220, binary matching service 230, and snippet matching service 240 are executed on the same computing device (e.g., a server) as auditor 140. In another embodiment, signature matching service 210, package manager matching service 220, binary matching service 230, and snippet matching service 240 are executed on one or more other computing devices separate from auditor 140.

In response to a request to analyze a set of files, such as those in host data 128, auditor 140 can issue a command or call to one or more of signature matching service 210, package manager matching service 220, binary matching service 230, and snippet matching service 240. In one embodiment, the request specifically identifies one or more matching techniques to be used, in which case auditor 140 can issue the command or call to one or more corresponding services. In another embodiment, auditor 140 can automatically identify one or more services to utilize based on a context of the request (e.g., a requestor, the type of files to be analyzed, the timing of the request, etc.). In another embodiment, auditor 140 can issue the command or call to all of the available services in response to the request.

Signature matching service 210 can perform signature matching by traversing a file system tree and creating hashes of file contents, in addition to hashes of representations of archive or directory contents. Those hashes, which can also be referred to as signatures, are then compared by the auditor 140 to hashes stored in a master database, which can be referred to as the knowledge base, to identify open-source components on the scanned file system (e.g., host data 128).

Package manager matching service 220 can perform package manager matching by examining metadata stored by a host system's package manager, which indicates the software packages installed on the system that are managed by the package manager. The auditor 140 can use this information to assemble an external identifier for each package or component installed, which in turn, is used in conjunction with the platform namespace to obtain detailed information about the component installed, such as whether it is an open source component.

Binary matching service 230 can perform binary matching by examining strings contained within compiled binaries of components to extract a component name and version information. The auditor 140 can use this information to assemble an external identifier for each package or component installed, which in turn, is used in conjunction with the platform namespace to obtain detailed information about the component installed, such as whether it is an open source component.

Snippet matching service 240 can function in a similar fashion to signature matching 210. Snippet matching service 240 can examine file contents one at a time using a sliding hash window, for example, and create hashes of equal-size groups of consecutive non-whitespace characters within text files. In practice, these text files may be limited to source code. Those hashes, also known as fingerprints, are then compared by the auditor 140 to hashes stored in the knowledge base, to identify open-source components on the scanned file system. In some systems, fingerprints are only generated from files not matched by the signature matching process, although this behavior is configurable.

Responsive to a command or call from auditor 140, the various matching services can each perform a scan of the files to which they are directed, and return a respective set of results to auditor 140. Each set of results can include entries representing the components identified using a corresponding scanning technology (e.g., signature, package manager, binary, or snippet scanning). As described herein, the auditor 140 can correlate the separate results, such as by using external identifiers which act as descriptors for all match results, and therefore can be used to correlate results.

Auditor 140 can determine that there is full correlation between the results when there is a complete match of the external identifiers for a given component in two different results. This is true regardless of the ambiguity of any result (e.g., the result of signature matching service 210). For example, if a given occurrence of a signature indicates more than one version of a project, and there is equal evidence supporting these versions, then the result is said to be ambiguous. In such a case, if there is full correlation between one of the versions and a given external identifier result (e.g., the result of package manager matching service 220 or binary matching service 230), then the results are correlated around that version and that version is chosen. If a result is unambiguous (e.g., if only one version is found for a given instance of a signature) and there is full correlation with an external identifier result, then that result can be chosen.

Match confidence is a term used to describe the quality of a match result. In the context of signature matching, match confidence indicates the number of files in an artifact that were matched, as a percentage of the total number of files. Another definition of match confidence can be used for external identifier matching, as well as the correlation of signature and external identifier results. This definition can be based on how many fields of an external identifier were matched between the request and the results. In some embodiments, certain fields can be weighted more favorably than others.

In certain embodiments, an integrated result may not be discarded each time the entire external identifier is not correlated, as long as some fields of the external identifier are correlated. For example, auditor 140 can use a match confidence descriptor when there is only a partial match between external identifiers, as well as in the case where the external identifier match returns partial results. In one embodiment, a partial result might include project name and all parts of the version, but not the architecture, for example.

In the event of a partial correlation, auditor 140 can optionally add both results to the unified set of results, or include just the external identifier result. Depending on the embodiment, the match confidence value can be used to determine which result is chosen. In one embodiment, both results can be included along with the confidence descriptor to enable the customer or other user to make an informed decision.

Figure 3:
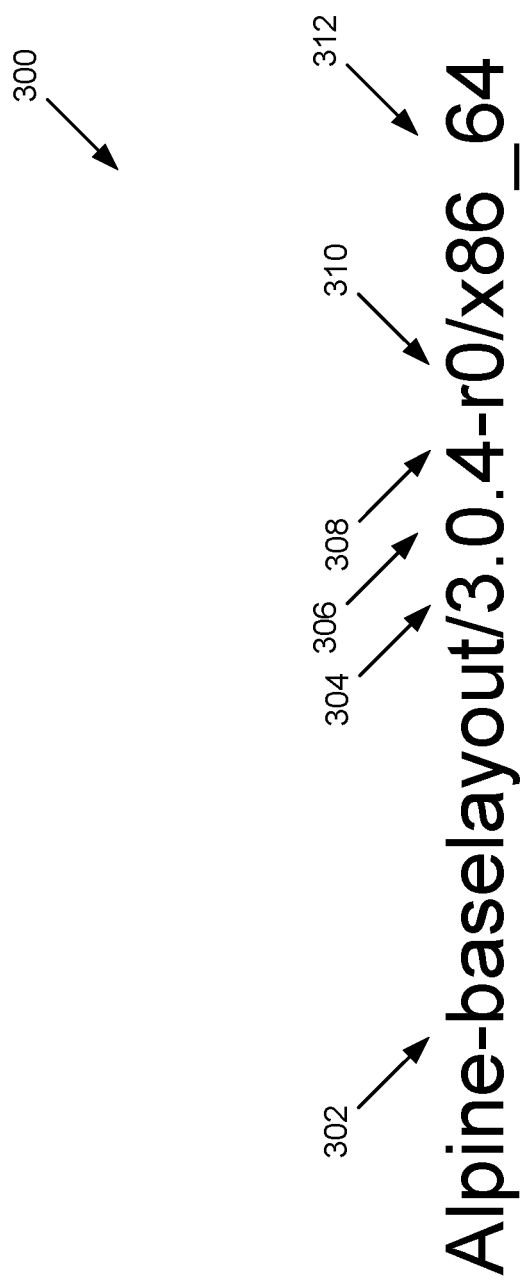
FIG. 3 illustrates one example of an external identifier associated with an open source component in accordance with some embodiments of the present disclosure.

FIG. 3 illustrates one example of an external identifier associated with an open source component in accordance with some embodiments of the present disclosure. As discussed above, external identifier 300 can be one example of a unique identifier having a defined format that is associated with each component, such as the open source components in host data 128. For certain scanning techniques, the external identifier is included in the results provided to auditor 140 by the respective services. For example, package manager matching service 220 and binary matching service 230 can both provide external identifiers of the identified components to the auditor 140 along with their respective sets of results. The results from the matching services will always directly include the external identifiers for the identified components, as they are the basis for correlation of the scanning results.

The example external identifier 300 includes a number of fields arranged in a defined format, which together uniquely identify a particular component (e.g., an open source component). In one embodiment, the fields are hierarchical, with the first field being the broadest, and each successive field including a narrower portion of the identifier. As illustrated in the example of FIG. 3, field 302 represents a project name, in this case "alpine-baselayout". Field 304 represents a major version identifier, in this case "3". Field 306 represents a minor version identifier, in this case "0". Field 308 represents a patch version identifier, in this case "4". Field 310 represents a revision identifier, in this case "r0". Field 312 represents an architecture identifier, in this case "x86_64". In other embodiments, the external identifier can include different and/or additional fields, such as an epoch identifier, for example. In other embodiments, the external identifier can have some other defined format, such that the fields may be arranged or presented differently (e.g., having a different set of fields present, such as having an epoch identifier, but not a revision identifier).

Figure 4:
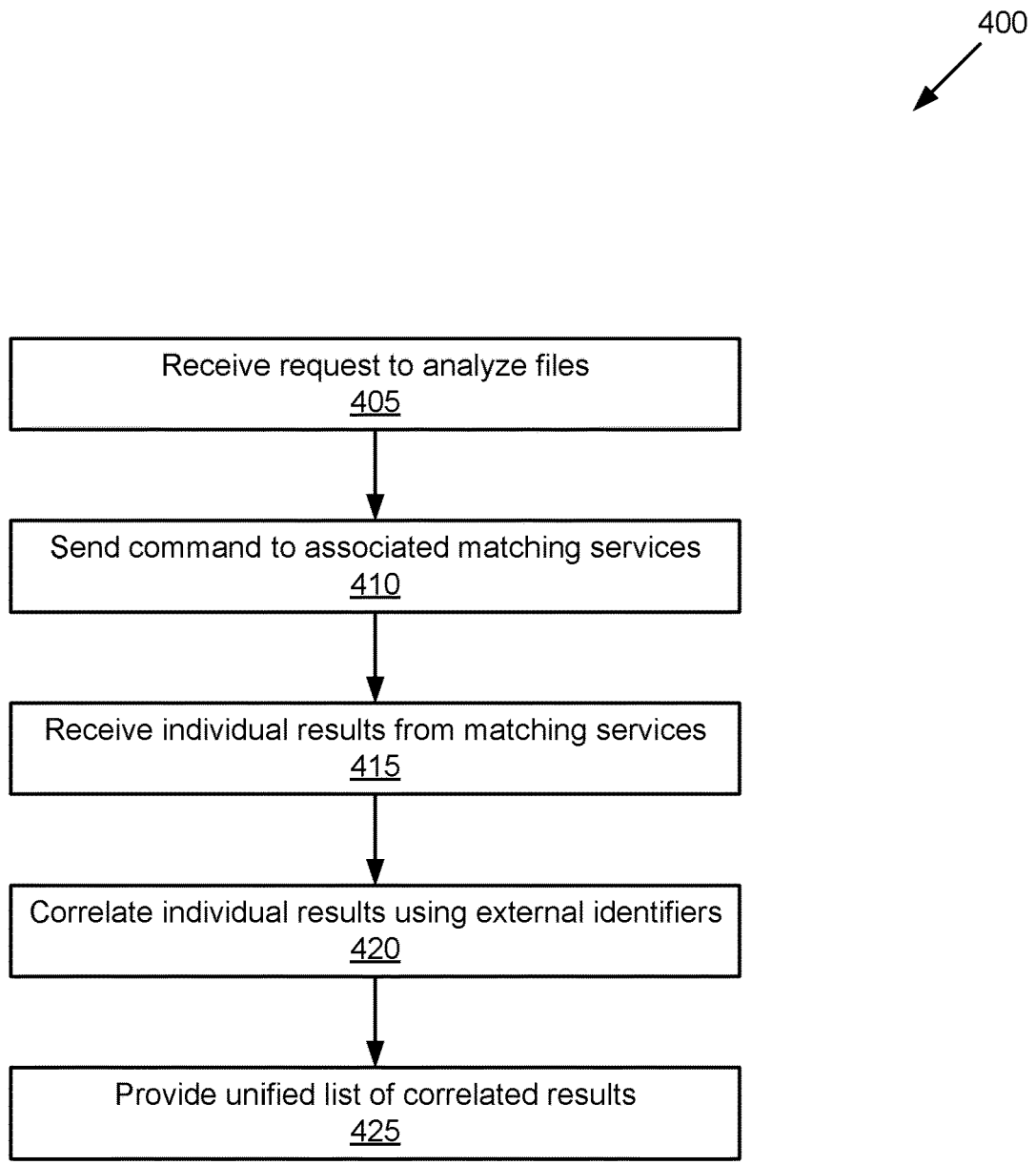
FIG. 4 is a flow diagram illustrating a method of analyzing files of a file system using different matching services in accordance with some embodiments of the present disclosure.

FIG. 4 is a flow diagram illustrating a method of analyzing files of a file system using different matching services in accordance with some embodiments of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. In one embodiment, method 400 may be performed by auditor 140, as shown in FIG. 1 and FIG. 2.

Referring again to FIG. 4, at operation 405, the processing logic receives a request from a requestor to analyze a file hierarchy comprising a plurality of components. In one embodiment, the request is received by auditor 140 from host 120 (e.g., via network 110). In another embodiment, the request is received from some other device. The request can include, for example, an indication of the file hierarchy, such as at least a portion of host data 128, and can optionally include an indication of one or more matching services to be used in the analysis. As described above, the file hierarchy can include a file system or other arrangement of files, directories, or other components.

At operation 410, the processing logic sends respective commands to a plurality of matching services. For example, auditor 140 can send respective commands to any of signature matching service 210, package manager matching service 220, binary matching service 230, and/or snippet matching service 240. In one embodiment, each of the plurality of matching services is to identify a respective subset of the plurality of components using a different respective scanning technique of a plurality of scanning techniques. As described above, those plurality of scanning techniques can include one or more of signature matching, package manager matching, binary matching, or snippet matching. In one embodiment, each of the matching services are configured to identify specific components from the plurality of components in host data 128. For example, the matching services can be configured to identify open source components, or components that include open source content. Depending on the implementation, the respective commands can include requests, calls (e.g., API calls), or other indications to perform a scan or other analysis of the identified file hierarchy.

At operation 415, the processing logic receives respective individual results from the plurality of matching services, each of the respective individual results indicating a respective subset of the plurality of components. In one embodiment, each of signature matching service 210, package manager matching service 220, binary matching service 230, and snippet matching service 240, or any subset of those to which a command was sent at operation 410, can provide a separate individual result to auditor 140. Each separate individual result can include an indication of components from the file hierarchy which met the criteria used by the respective matching service. Since each matching service uses a different scanning technology, there are likely to be differences between the individual results. In one embodiment, each separate individual result can include one or more entries, where each entry is associated with a different open source component. The individual results can further include metadata associated with each entry, such as an indication of the scanning technology used to create the result, and/or a confidence score. The confidence score can be an indication (e.g., expressed as a decimal or percentage) of how strong the result is. For example, a confidence score of 100% can indicate absolute certainty that the associated component is an open source component, while lower a confidence score (e.g., 70%) can indicate a strong likelihood that the associated component is an open source component, but also indicate that there is some possibility of error.

In one embodiment, the individual results from certain matching services can also include an external identifier, such as the external identifier 300 illustrated in FIG. 3. For example, the individual results from package manager matching service 220 and binary matching service 230 can include external identifiers associated with each component included in the respective individual results. Since the individual results from other matching services, such as signature matching service 210 and snippet matching service 240 may not include external identifiers, auditor 140 may generate external identifiers for the components included in those respective results. For example, the individual results from signature matching service 210 and snippet matching service 240 may include sufficient information to allow auditor 140 to populate all, or at least a portion of, the fields of the external identifiers and assign those external identifiers to the corresponding components. In one embodiment, auditor 140 stores the received individual results, including the external identifiers, as audit data 148.

At operation 420, the processing logic correlates the respective individual results using external identifiers associated with the components of each respective subset to generate a unified set of results. In one embodiment, correlating the respective individual results using the external identifiers includes removing duplicate entries from the respective individual results and disambiguating version discrepancies in the respective individual results. Additional details of the correlating are provided below with respect to FIG. 5.

At operation 425, the processing logic provides the unified set of results to the requestor. In one embodiment, auditor 140 can generate a list of components to form the unified set of results and, to provide the unified set of results to the requestor, can cause the list to be displayed in a user interface (e.g., of auditor 140 or host 120) using a consistent normalized descriptor, such as the external identifier. In other embodiments, auditor 140 can send the unified set of results to host 120 (e.g., via network 110) or other device in some other manner.

Figure 5:
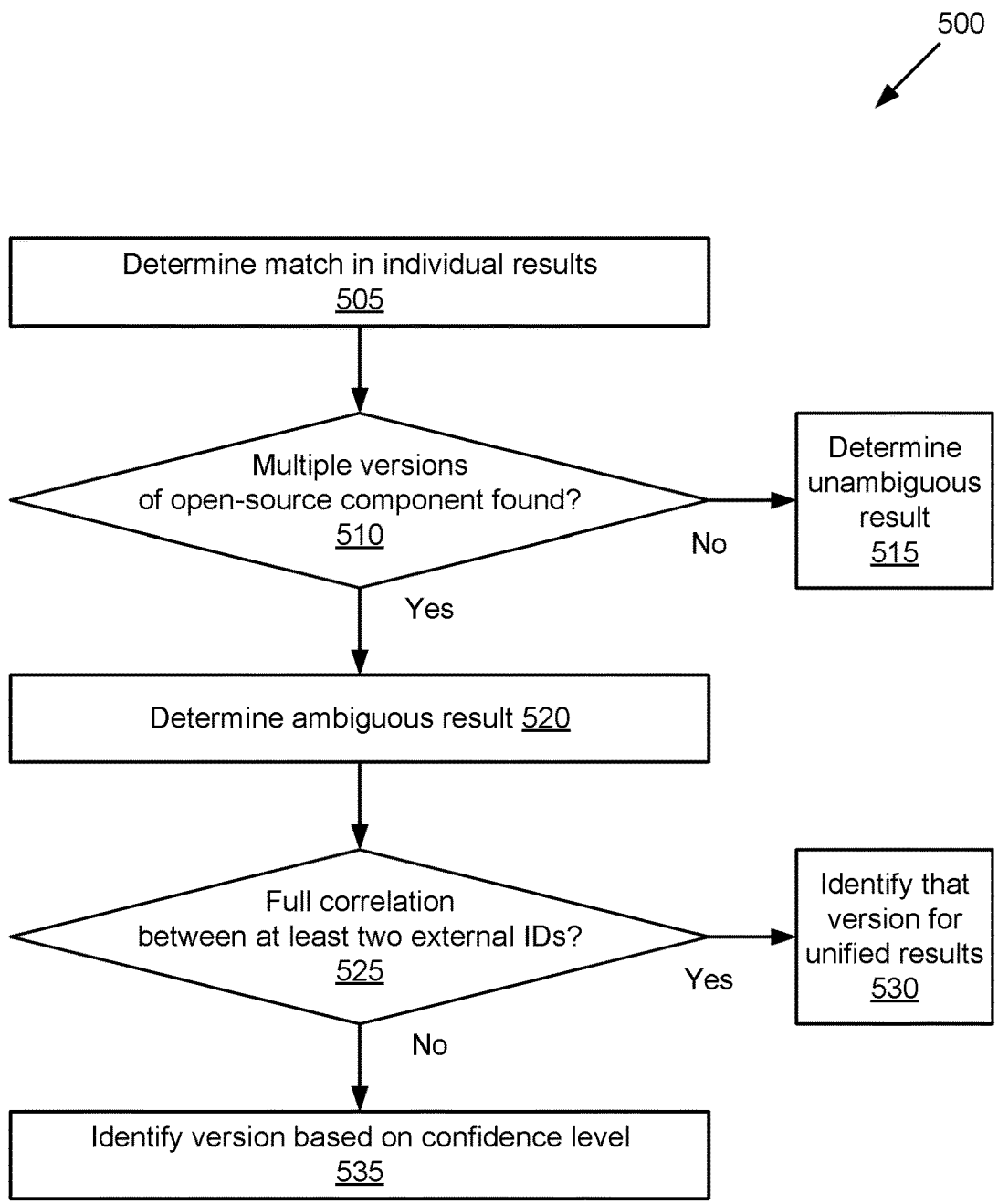
FIG. 5 is a flow diagram illustrating a method of correlating component matching results using different scanning techniques in accordance with some embodiments of the present disclosure.

FIG. 5 is a flow diagram illustrating a method of correlating component matching results using different scanning techniques in accordance with some embodiments of the present disclosure. The method 500 may be performed by processing logic that includes hardware (e.g., circuitry, dedicated logic, programmable logic, microcode, etc.), software (e.g., instructions run on a processor to perform hardware simulation), or a combination thereof. In one embodiment, method 500 may be performed by auditor 140, as shown in FIG. 1 and FIG. 2.

Referring again to FIG. 5, at operation 505, the processing logic determines the presence of a match in at least one of the individual results. The presence of a match can include an entry indicating a component in one of the individual results received from any of the matching services. Depending on the scanning technology used, the match can be determined in a different manner. For example, in results from signature matching service 210 or snippet matching service 240, the match can be determined based on a hash of a file contents or a snippet of the file contents matching a hash stored in a master database (e.g., a knowledge base) of known open source components, which can be maintained by auditor 140 (e.g., in audit data 148). In results from package manager matching service 220 or binary matching service 230, the match can be determined based on the provided external identifier matching an identified stored in the master database.

At operation, 510, the processing logic determines whether multiple versions of one component are represented in the respective individual results. As indicated above, since each matching service utilizes a different scanning technology to determine the respective individual results, there can be discrepancies between the different individual results. For example, while multiple matching services could identify the same component, they could indicate different versions of this component. In one embodiment, auditor 140 can compare the entries in the respective individual results to determine if multiple versions are represented. If multiple versions of one component are not represented in the respective individual results, at operation 515, the processing logic determines that the result is unambiguous. For example, if only one version is indicated, and the confidence score associated with any one of the respective individual results is 100%, then no further correlation is needed, and that version of the component can be included in the unified set of results. If multiple versions of one component are represented in the respective individual results, or if no confidence score from any of the respective individual results is 100%, at operation 520, the processing logic determines that the result is ambiguous.

At operation 525, the processing logic determines whether a full correlation between at least two external identifiers of the multiple versions is present. A full correlation is present when the at least two external identifiers match exactly. In one embodiment, the auditor 140 can compare the external identifiers, such as external identifier 300, either received with the respective individual results or determined based on the respective individual results. Responsive to the full correlation between the at least two external identifiers of the multiple versions being present, at operation 530, the processing logic identifies a first version of the multiple versions to be included in the unified set of results. That first version can be the version represented in the multiple matching external identifiers. For example, field 304 can indicate the major version and field 306 can indicate the minor version.

Responsive to the full correlation between the at least two external identifiers of the multiple versions not being present, at operation 535, the processing logic identifies a second version of the multiple versions having a highest confidence score to be included in the unified set of results. For example, if the external identifiers for a given component in the respective individual results from two different matching services each indicate a different version, and therefore are not fully correlated, the auditor 140 can select the version indicated in the external identifier from the individual result having a highest individual confidence score. In one embodiment, the auditor 140 can compare the individual confidence scores to one another to determine which is higher, and can include the corresponding external identifier in the unified set of results.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving, by a processing device, a request to analyze a file hierarchy comprising a plurality of components;
   sending, by the processing device, respective commands to a plurality of matching services;
   receiving, by the processing device, respective individual results from the plurality of matching services, each of the respective individual results indicating a respective subset of the plurality of components, wherein each of the plurality of matching services is to identify the respective subset of the plurality of components using a different respective scanning technique of a plurality of scanning techniques, the plurality of scanning techniques comprising (i) signature matching where cryptographic hashes are created for the plurality of components and compared to cryptographic hashes of known components in the respective subset, (ii) package manager matching using metadata stored by a host system package manager and indicating the respective subset of the plurality of components, (iii) binary matching using compiled binaries of the plurality of components to extract identifying information of the respective subset, and (iv) snippet matching where cryptographic hashes are created for snippets of characters in source code of the plurality of components and compared to cryptographic hashes of known components in the respective subset; and
   correlating, by the processing device, the respective individual results using external identifiers associated with the components of each respective subset to generate a unified set of results, wherein the external identifiers each represent a respective individual file and comprise a plurality of fields arranged in a defined hierarchical format to uniquely identify the individual file, wherein each field of the plurality of fields comprises a broader categorical descriptor of the individual file than a successive field in the external identifier.

2. The method of claim 1, further comprising:
   providing, by the processing device, the unified set of results to a requestor that provided the request, wherein providing the unified set of results to the requestor comprises causing the unified set of results to be displayed in a user interface using a consistent normalized descriptor.

3. The method of claim 1, wherein correlating the respective individual results using the external identifiers comprises removing duplicate entries from the respective individual results and disambiguating version discrepancies in the respective individual results.

4. The method of claim 1, wherein correlating the respective individual results using the external identifiers comprises:
   determining that multiple versions of one component are represented in the respective individual results; and
   determining whether a full correlation between at least two external identifiers of the multiple versions is present.

5. The method of claim 4, wherein correlating the respective individual results using the external identifiers further comprises:
   responsive to the full correlation between the at least two external identifiers of the multiple versions being present, identifying a first version of the multiple versions to be included in the unified set of results.

6. The method of claim 5, wherein correlating the respective individual results using the external identifiers further comprises:
   responsive to the full correlation between the at least two external identifiers of the multiple versions not being present, identifying a second version of the multiple versions having a highest confidence score to be included in the unified set of results.

7. A system comprising:
   a repository configured to store a file hierarchy comprising a plurality of components; and
   a processing device, coupled to the repository and configured to perform operations comprising:
      receiving a request to analyze the file hierarchy comprising the plurality of components;
      sending respective commands to a plurality of matching services;
      receiving respective individual results from the plurality of matching services, each of the respective individual results indicating a respective subset of the plurality of components, wherein each of the plurality of matching services is to identify the respective subset of the plurality of components using a different respective scanning technique of a plurality of scanning techniques, the plurality of scanning techniques comprising (i) signature matching where cryptographic hashes are created for the plurality of components and compared to cryptographic hashes of known components in the respective subset, (ii) package manager matching using metadata stored by a host system package manager and indicating the respective subset of the plurality of components, (iii) binary matching using compiled binaries of the plurality of components to extract identifying information of the respective subset, and (iv) snippet matching where cryptographic hashes are created for snippets of characters in source code of the plurality of components and compared to cryptographic hashes of known components in the respective subset; and
      correlating the respective individual results using external identifiers associated with the components of each respective subset to generate a unified set of results, wherein the external identifiers each represent a respective individual file and comprise a plurality of fields arranged in a defined hierarchical format to uniquely identify the individual file, wherein each field of the plurality of fields comprises a broader categorical descriptor of the individual file than a successive field in the external identifier.

8. The system of claim 7, wherein the processing device is configured to perform operations further comprising:

providing the unified set of results to a requestor that provided the request, wherein providing the unified set of results to the requestor comprises causing the unified set of results to be displayed in a user interface using a consistent normalized descriptor.

9. The system of claim 7, wherein correlating the respective individual results using the external identifiers comprises removing duplicate entries from the respective individual results and disambiguating version discrepancies in the respective individual results, and wherein the plurality of fields in the external identifier comprises a project name field, a version identifier field, a revision identifier field, and an architecture identifier field.

10. The system of claim 7, wherein correlating the respective individual results using the external identifiers comprises:
    determining that multiple versions of one component are represented in the respective individual results; and
    determining whether a full correlation between at least two external identifiers of the multiple versions is present.

11. The system of claim 10, wherein correlating the respective individual results using the external identifiers further comprises:
    responsive to the full correlation between the at least two external identifiers of the multiple versions being present, identifying a first version of the multiple versions to be included in the unified set of results.

12. The system of claim 11, wherein correlating the respective individual results using the external identifiers further comprises:
    responsive to the full correlation between the at least two external identifiers of the multiple versions not being present, identifying a second version of the multiple versions having a highest confidence score to be included in the unified set of results.

13. A non-transitory computer-readable storage medium storing instructions which, when executed, cause a processing device to perform operations comprising:
    receiving, by the processing device, respective individual results from a plurality of matching services, each of the respective individual results indicating a respective subset of a plurality of components in a file hierarchy, wherein each of the plurality of matching services is to identify the respective subset of the plurality of components using a different respective scanning technique of a plurality of scanning techniques, the plurality of scanning techniques comprising (i) signature matching where cryptographic hashes are created for the plurality of components and compared to cryptographic hashes of known components in the respective subset, (ii) package manager matching using metadata stored by a host system package manager and indicating the respective subset of the plurality of components, (iii) binary matching using compiled binaries of the plurality of components to extract identifying information of the respective subset, and (iv) snippet matching where cryptographic hashes are created for snippets of characters in source code of the plurality of components and compared to cryptographic hashes of known components in the respective subset;
    determining whether multiple versions of one component are represented in the respective individual results;
    responsive to multiple versions of one component being represented, determining whether a full correlation between at least two external identifiers of the multiple versions is present; and
    responsive to the full correlation between the at least two external identifiers of the multiple versions being present, identifying a first version of the multiple versions to be included in a unified set of results, wherein the external identifiers each represent a respective individual file and comprise a plurality of fields arranged in a defined hierarchical format to uniquely identify the individual file, wherein each field of the plurality of fields comprises a broader categorical descriptor of the individual file than a successive field in the external identifier.

14. The non-transitory computer-readable storage medium of claim 13, wherein the instructions cause the processing device to perform operations further comprising:
    removing duplicate entries from the respective individual results and disambiguating version discrepancies in the respective individual results.

15. The non-transitory computer-readable storage medium of claim 13, wherein the instructions cause the processing device to perform operations further comprising:
    responsive to the full correlation between the at least two external identifiers of the multiple versions not being present, identifying a second version of the multiple versions having a highest confidence score to be included in the unified set of results.

16. The non-transitory computer-readable storage medium of claim 13, wherein the instructions cause the processing device to perform operations further comprising:
    responsive to multiple versions of one component not being represented, including a single version of the one component in the unified set of results.

17. The non-transitory computer-readable storage medium of claim 13, wherein the instructions cause the processing device to perform operations further comprising:
    receiving a request to analyze the file hierarchy comprising the plurality of components; and
    sending respective commands to a plurality of matching services.

* * * * *